United States Patent
Bouzid et al.

(10) Patent No.: US 11,351,891 B2
(45) Date of Patent: Jun. 7, 2022

(54) SYSTEM COMPRISING A VEHICLE SEAT WITH TILTING BACKREST

(71) Applicant: FAURECIA Sièges d'Automobile, Nanterre (FR)

(72) Inventors: Farouk Bouzid, Bretigny sur Orge (FR); Philippe Resende, Bruyeres le Chatel (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 193 days.

(21) Appl. No.: 16/571,669

(22) Filed: Sep. 16, 2019

(65) Prior Publication Data
US 2020/0101869 A1 Apr. 2, 2020

(30) Foreign Application Priority Data

Sep. 27, 2018 (FR) ...................................... 18 58918
Apr. 26, 2019 (FR) ...................................... 19 04485

(51) Int. Cl.
*B60N 2/02* (2006.01)
*B60N 2/20* (2006.01)

(52) U.S. Cl.
CPC ......... *B60N 2/0232* (2013.01); *B60N 2/0244* (2013.01); *B60N 2/20* (2013.01)

(58) Field of Classification Search
CPC ........ B60N 2/20; B60N 2/0244; B60N 2/146; B60N 2/14; B60N 2/0232
See application file for complete search history.

(56) References Cited

U.S. PATENT DOCUMENTS

| 4,402,547 | A | | 9/1983 | Weston | |
|---|---|---|---|---|---|
| 5,197,007 | A | * | 3/1993 | Parker | B60N 2/0228 296/65.16 |
| 7,967,385 | B2 | | 6/2011 | Cillierre | |
| 8,066,326 | B2 | * | 11/2011 | Hurst, III | B60N 2/3065 297/321 |
| 8,313,144 | B2 | * | 11/2012 | Holdampf | B60N 2/22 297/340 |
| 2007/0236068 | A1 | * | 10/2007 | Deissmann | B60N 2/305 297/378.14 |
| 2008/0100115 | A1 | | 5/2008 | Kojima | |

(Continued)

FOREIGN PATENT DOCUMENTS

DE 102011120854 A1 6/2013
DE 102015213188 A1 1/2017
(Continued)

OTHER PUBLICATIONS

French Search Report for FR 1858918 established May 21, 2019, 9 pages, no English translation available.
(Continued)

*Primary Examiner* — David R Dunn
*Assistant Examiner* — Christopher E Veraa
(74) *Attorney, Agent, or Firm* — Barnes & Thornburg LLP

(57) ABSTRACT

System including a vehicle seat comprising a seating portion, a backrest pivotally mounted on the seat by a lockable hinge mechanism, the seat further comprising a motorized adjustment device connected to the backrest independently of the hinge mechanism. An electric control device synchronously controls the hinge mechanism and the motorized adjustment device.

17 Claims, 21 Drawing Sheets

(56) References Cited

U.S. PATENT DOCUMENTS

| | | | |
|---|---|---|---|
| 2008/0203789 A1* | 8/2008 | Diehl | B60N 2/366 297/217.3 |
| 2010/0060061 A1* | 3/2010 | Koga | B60N 2/1803 297/344.1 |
| 2010/0084903 A1* | 4/2010 | Kammerer | B60N 2/12 297/329 |
| 2017/0015221 A1 | 1/2017 | Spangler | |
| 2017/0334314 A1* | 11/2017 | Takada | B60N 2/1635 |
| 2018/0111513 A1* | 4/2018 | Scott | B60N 2/22 |
| 2018/0236903 A1 | 8/2018 | Chatwin | |
| 2019/0152352 A1* | 5/2019 | Handigol | B60N 2/1695 |
| 2019/0168644 A1* | 6/2019 | Kim | B60N 2/04 |
| 2019/0299818 A1* | 10/2019 | Sasaki | B60N 2/12 |

FOREIGN PATENT DOCUMENTS

| | | |
|---|---|---|
| DE | 102015213192 A1 | 1/2017 |
| FR | 2928881 A1 | 9/2009 |

OTHER PUBLICATIONS

German Office Action for German Patent App. No. 10 2019 125 835.9 dated Apr. 7, 2021, 15 pages.

* cited by examiner

SYSTEM COMPRISING A VEHICLE SEAT WITH TILTING BACKREST

PRIORITY CLAIM

This application claims priority to French Patent Application No. FR 18 58918, filed Sep. 27, 2018, and French Patent Application No. FR 19 04485, filed Apr. 26, 2019, each of which is expressly incorporated by reference herein.

BACKGROUND

The present disclosure relates to systems comprising a vehicle seat, and particularly to vehicle seats with a backrest. More particularly, the present disclosure relates to vehicle seat with a tilting backrest.

SUMMARY

According to the present disclosure, a system comprises a seating portion of a seat and a backrest of a seat. The backrest is pivotally mounted relative to the seating portions.

In illustrative embodiments, at least one hinge mechanism pivotally connecting the backrest to the seating portion and suitable for adjusting an angular position of the backrest relative to the seating portion, said hinge mechanism being controlled by a control member movable between a locking position in which said control member places said hinge mechanism in a locked state immobilizing the backrest, and an unlocking position in which said control member places said hinge mechanism in an unlocked state allowing the tilting of the backrest, said control member further being resiliently biased towards the locking position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

In the various figures, the same references designate identical or similar elements.

Figure 1:
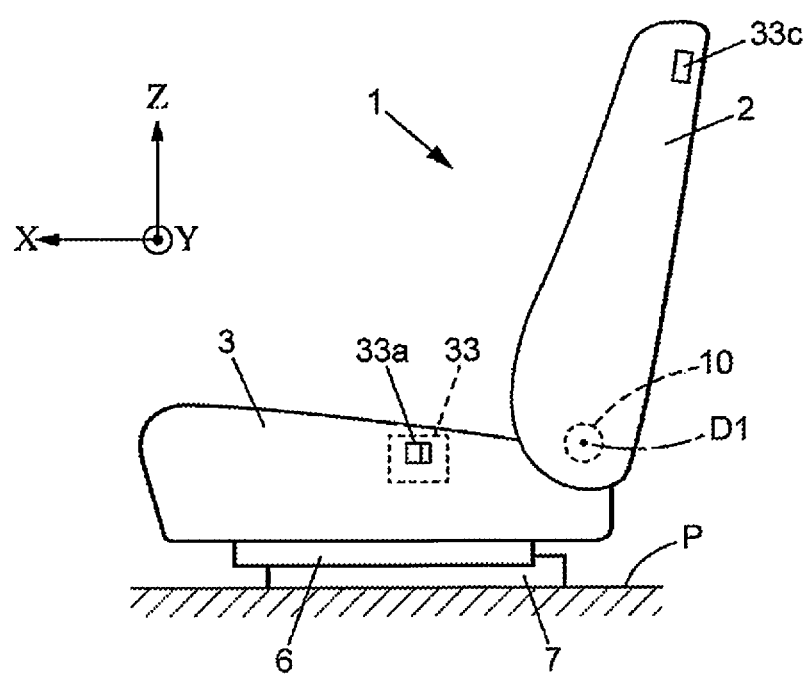
FIG. 1 is a schematic view of a motor vehicle seat.

FIG. 1 illustrates a vehicle seat 1, in particular for a motor vehicle. The seat 1 comprises a backrest 2 and a seating portion 3.

The seating portion 3 is mounted on the floor P of the vehicle, for example, by means of rails which allow adjusting the position of the seating portion in a longitudinal direction X. Each rail may comprise a fixed profile 7 integral with the floor P and a movable profile 6 integral with the seating portion 3. The movable profiles 6 of the two rails together form a base or carriage carrying the seating portion 3.

The backrest 2 is mounted, by at least one hinge mechanism 10, so as to pivot about a transverse axis of rotation D1, which extends parallel to a horizontal transverse direction Y that is perpendicular to the longitudinal direction X. The pivoting of the backrest 2 is actuated electrically and controlled by a user via a control interface 33a which can be of any known type (control button (single, double, or two-way), joystick, or other type) which controls an electric control device 33 represented highly schematically in FIG. 1. The electric control device 33 may be of any suitable type; in particular it may include a microcontroller or other electronic processor. The control interface 33a may be mounted on or near the seat 1. Similarly, the electric control device 33 may or may not be integrated into the seat 1.

The seat 1 may further comprise at least one additional control interface 33c, for example a double-action control button or some other type, which controls a change of position of the seat, for example to move to a position allowing access to the rear seats or a console position, as will be explained below.

When the pivoting of the backrest 2 is not being actuated by the electric control device 33, the backrest 2 is locked in position by said hinge mechanism 10.

The hinge mechanism 10 is controlled by a control member 14a which will be described further below, which is movable between: a locking position in which said control member 14a places said hinge mechanism 10 in a locked state immobilizing the backrest 2, and an unlocking position in which said control member 14a places said hinge mechanism 10 in an unlocked state allowing tilting of the backrest 2, said control member 14a further being resiliently biased towards the locking position. Reference is hereby made to French Patent Application FR292888A1 for disclosure relating to a hinge mechanism, which application is hereby incorporated in its entirety herein.

The seat 1 comprises a rigid structure, for example of metal, which is represented in particular in FIGS. 2 to 5.

The frame 4 of the backrest 2 may comprise in particular two side flanges 41 secured to each other for example by a rigid rear wall 42 or other.

The frame 5 of the seating portion 3 may comprise in particular two side flanges 51 and two curved side connecting rods L1. The side flanges 51 and the curved connecting rods L1 each extend in a plane parallel to the longitudinal direction X and to a vertical direction Z.

Figure 3:
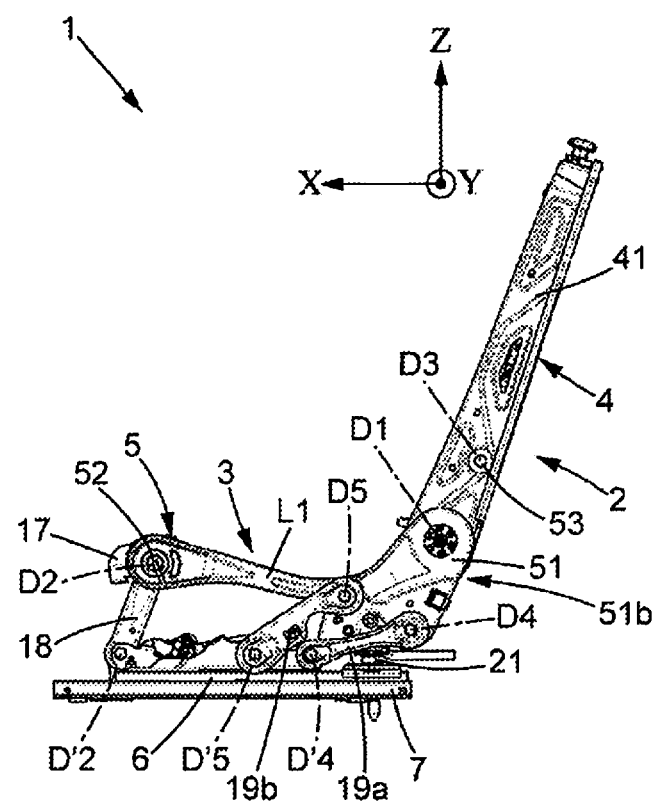
FIG. 3 is a side view of the seat frame of FIG. 2, with the backrest tilted in a first position.
Figure 4:
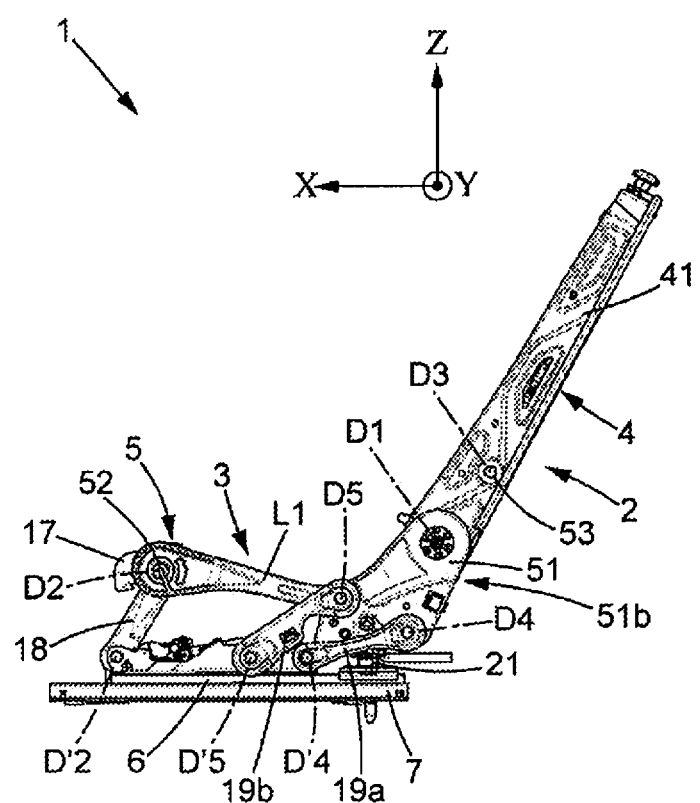
FIG. 4 is a view similar to FIG. 3, with the backrest tilted in a second position.
Figure 5:
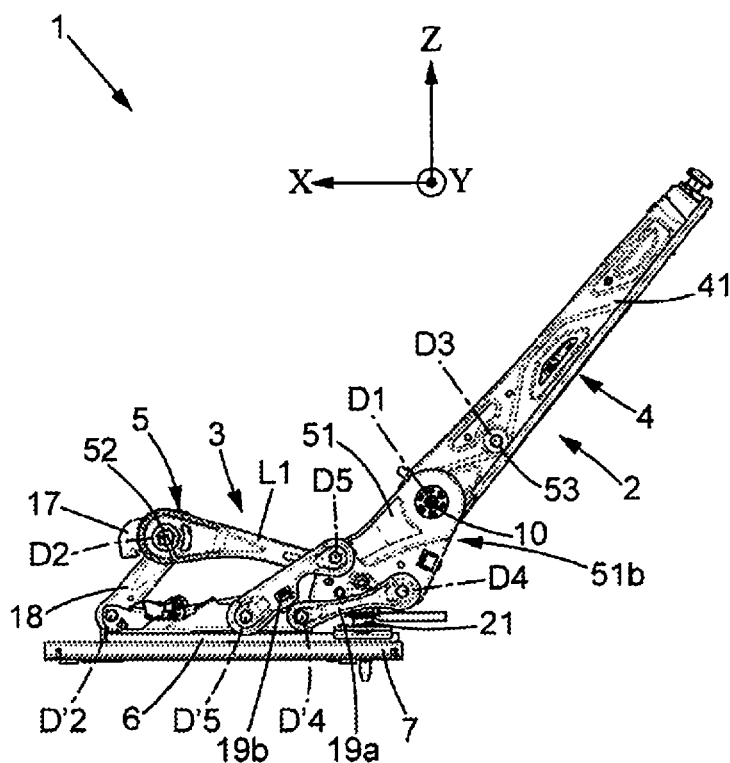
FIG. 5 is a view similar to FIG. 3, with the backrest tilted in a third position.

The side flanges 51 of the seating portion are respectively connected to the movable profiles 6 of the rails. In the example shown, the side flanges 51 of the seating portion are respectively connected to the movable profiles 6 of the rails by two rear connecting rods 19a, 19b and are locked on the movable profiles 6 of the rails (and thus on the floor P of the vehicle) by an anchoring device 21 (FIGS. 3 to 5). The side flanges 51 may also be interconnected by at least one rigid cross-member 51a. Together with the cross-member 51a, the two side flanges form a backrest support 51b.

Each rear connecting rod 19a is mounted to pivot freely on the side flange 51 at a transverse axis of rotation D4 and on the movable profile 6 at a transverse axis of rotation D′4, these two axes of rotation being parallel to the transverse direction Y. Each rear connecting rod 19b is mounted to pivot freely on the side flange 51 at a transverse axis of rotation D5 and on the movable profile 6 at a transverse axis of rotation D′S, these two axes of rotation being parallel to the transverse direction Y. In this particular case, the release of the anchoring device 21 allows folding the backrest 2 forward. Reference is hereby made to French patent application No. 1758802 for disclosure relating to the anchor device, which disclosure is hereby incorporated by reference in its entirety. The mounting of the side flanges 51 on the movable profiles 6 could be different from the device disclosed in French patent application No. 1758802.

In addition, the side flanges 41 of the backrest are mounted on the side flange 51 of the seating portion so as to pivot about the abovementioned first transverse axis of rotation D1, by said at least one hinge mechanism 10. In the example shown, the seat 1 comprises two hinge mechanisms 10 respectively on the two sides of the seat, interconnected by the abovementioned control member 14a, in this case a control shaft. In the case of hinge mechanisms 10, or similar ones, the control member 14a controls the rotation of a control cam internal to each hinge mechanism 10, and each hinge mechanism comprises internal return springs which bias the control member 14a toward its locking position. As a variant, the seat 1 could comprise a single hinge mechanism 10 on one side of the backrest, the other flange 41 of the backrest then simply being pivotally mounted on the corresponding flange 51 of the seating portion.

Figure 9:
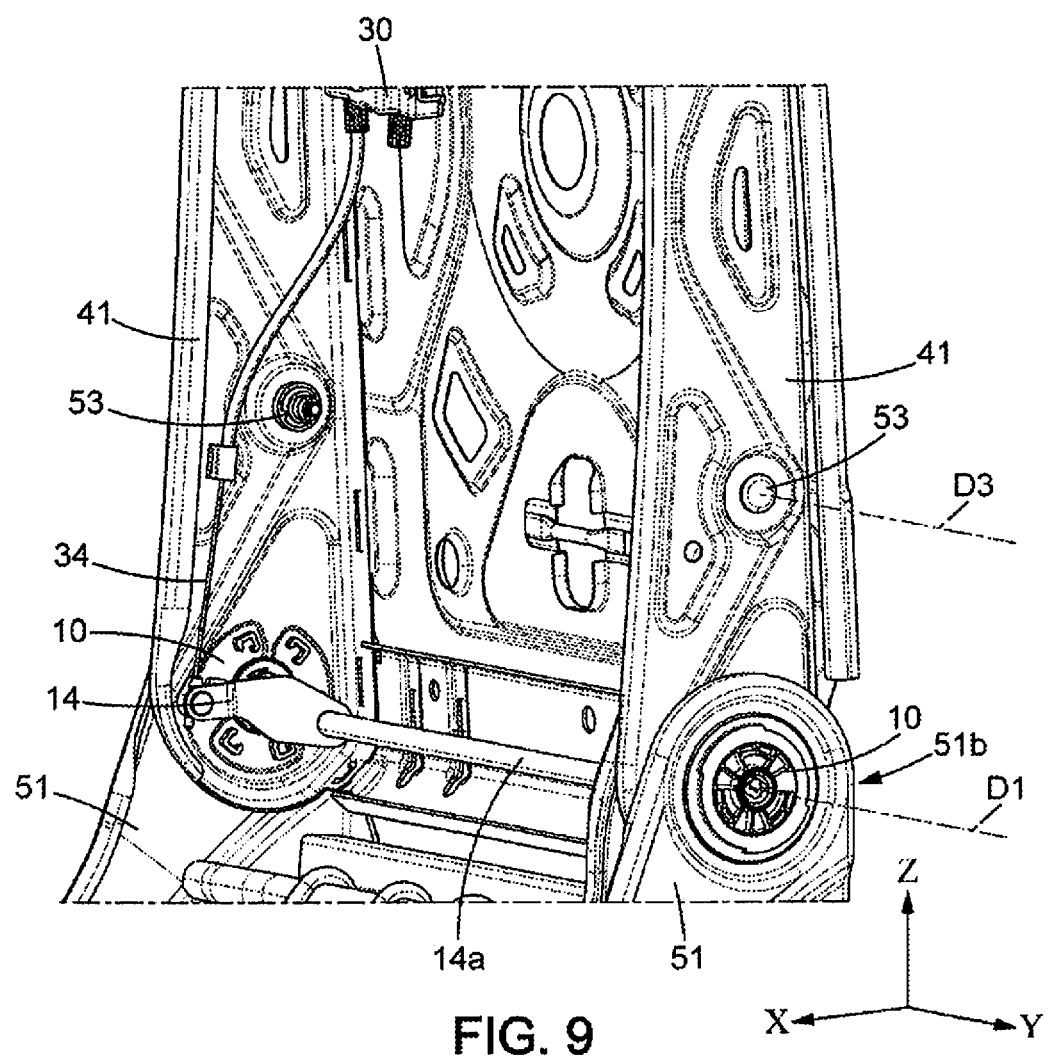
FIG. 9 is a detailed perspective view showing the mechanical control member that controls the hinge mechanism of the seat of FIG. 2.

As represented in FIG. 9, the control member 14a may for example be integral with a lever 14 controlled by a cable 34, in particular a Bowden type or similar.

The curved connecting rods L1 may be rigidly connected to each other by a front cross-member 17 and a rear cross-member 17a.

The front ends of the curved connecting rods L1 are respectively mounted on two front connecting rods 18. The upper end of each front connecting rod 18 is connected to the curved connecting rods L1 by a pivot 52 so as to pivot freely about a second transverse axis of rotation D2 parallel to the Y direction. The lower end of each front connecting rod is mounted by a pivot 28 on the movable profile 6 of the corresponding rail (in particular on a rigid support 20 integral to the movable profile 6), so as to pivot about a transverse axis of rotation D′2 parallel to the transverse direction Y.

The rear ends of the curved rods L1 are mounted by pivots 53 on the side flanges 41 of the backrest so as to pivot freely about a third transverse axis of rotation D3 parallel to the transverse direction Y. The third axis D3 is located between the first axis D1 and the upper end of the seat, therefore above the hinge mechanisms 10 in the normal position of use of the seat.

Figure 2:
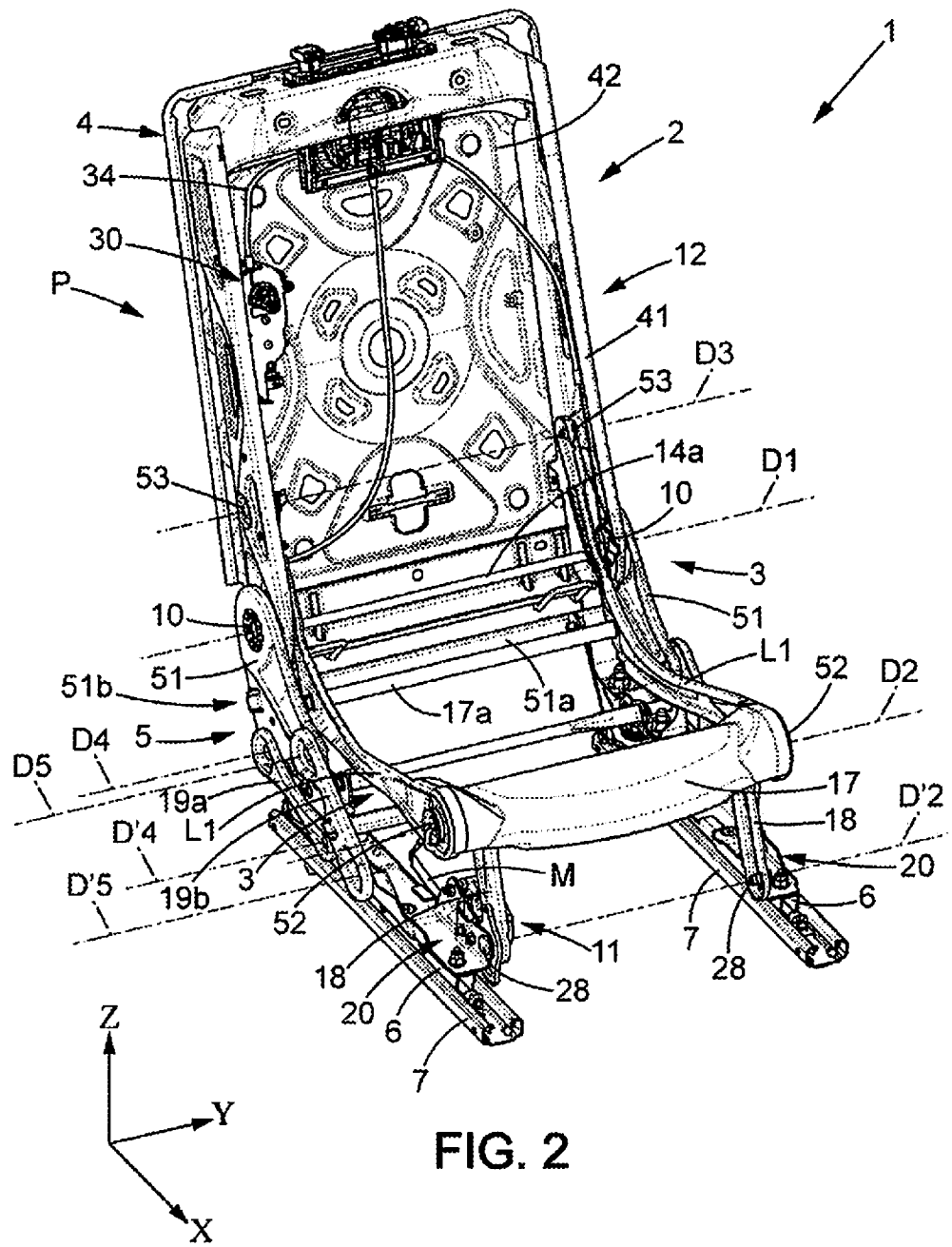
FIG. 2 is a perspective view of the seat frame of FIG. 1 according to a first embodiment.
Figure 6:
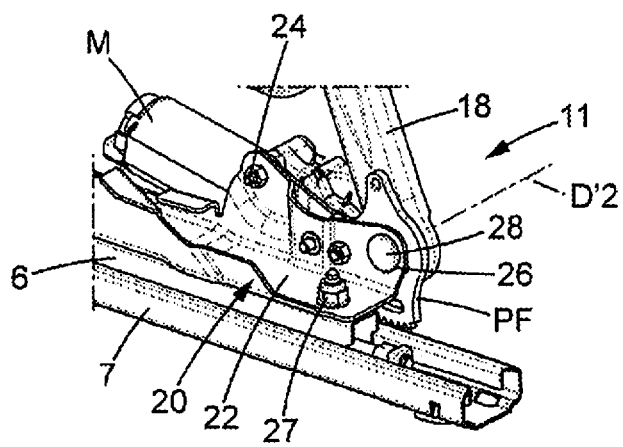
FIG. 6 is a detailed perspective view showing the assembly of a front connecting rod of the seat frame of FIG. 2, viewed in a first direction.
Figure 7:
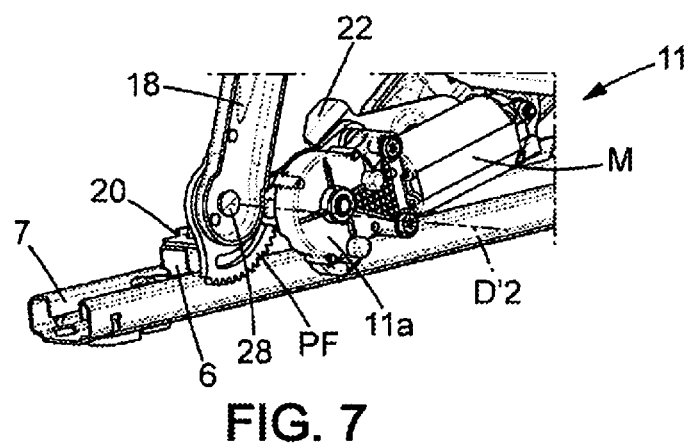
FIG. 7 is a detailed perspective view showing the front connecting rod of FIG. 6, viewed in a second direction.
Figure 8:
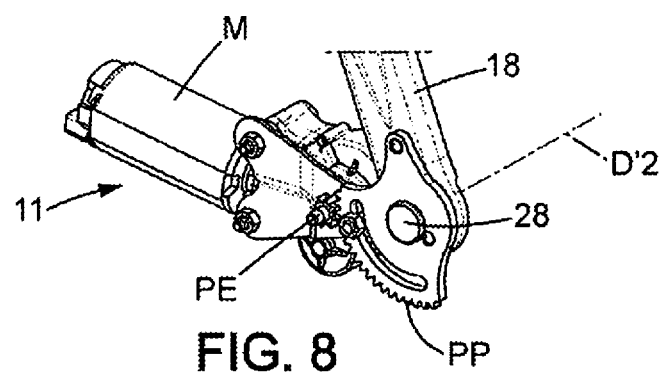
FIG. 8 is a detailed view showing part of the front connecting rod of FIG. 6 and its actuation device.

As represented in FIGS. 2 and 6 at 8, the lower end of one of the front connecting rods 18 may be mounted to pivot freely while the lower end of the other front connecting rod 18 is rotatable by an electric motorized adjustment device 11. Alternatively, an electric motorized adjustment device 11 could be provided on each front connecting rod 18.

The motorized adjustment device 11 comprises an electric motor M generally associated with a reduction gear 11a which drives a pinion PE that engages with a toothed sector PF having a circular toothed perimeter centered on axis of rotation D′2 and integral with the lower end of the front connecting rod 18 in question. The motor M allows pivoting the front connecting rods 18, therefore moving the curved connecting rods L1 forwards and/or backwards, which causes the backrest 2 to pivot about the first transverse axis of rotation D1 when the hinge mechanisms 10 are unlocked. Here, the motor M is mounted on the movable profile 6 of one of the rails, for example by means of the rigid support 20 mentioned above. For example, the rigid support 20 may comprise a substantially horizontal base 22 fixed to the movable profile 6 in particular by screws 27 or other means, and a substantially vertical flange 26 on which the front connecting rod 18 revolves. The motor M may be fixed on the flange 26 in particular by at least one screw 24 or other means.

The motorized adjustment device 11 is therefore mechanically connected to the backrest 2 independently of the hinge mechanisms, by means of front connecting rods 18 and curved connecting rods L1.

The motorized adjustment device 11 may be without any locking system, the motorized adjustment device 11 then not offering high resistance to external forces that can tend to rotate the front connecting rods 18, for example the forces of inertia present when the vehicle suffers an impact, in particular a front or rear impact. The motorized adjustment device 11 is then called reversible.

Note that the motorized adjustment device 11 could be of any other known type. For example, it could be a cylinder or other electric linear actuator, mounted for example between the movable profile 6 of the rail (or the rigid support 20) and the front connecting rod 18.

Alternatively, the motorized adjustment device 11 could be mounted between one of the front connecting rods 18 and the corresponding curved connecting rod L1.

Figure 10:
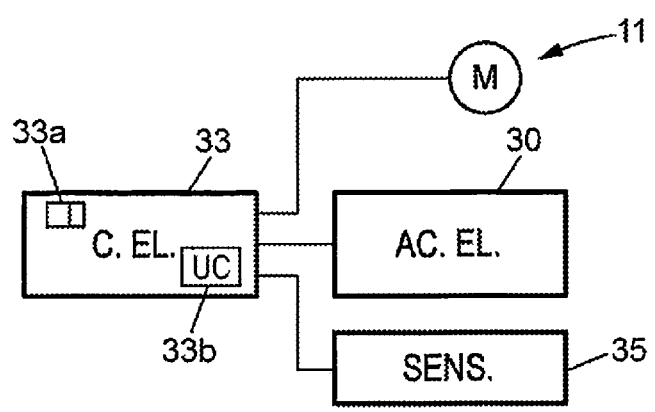
FIG. 10 is a block diagram of the electrical portions of the seat of FIG. 2.

As represented in FIG. 10, the electric motor M of the motorized adjustment device 11 is controlled by the above-mentioned electric control device 33 (C. EL.), which also controls an electric actuation device 30 (AC. EL.) which may be any known type of electric actuator (electric cylinder, solenoid actuator, or other) and which acts on the cable 34 to unlock the hinge mechanisms 10 when it is activated.

The electric control device 33 is operable by the user, via the control interface 33a.

The electric control device 33 may include an electronic controller 33b (UC) or other electronic processor.

In addition, the electric control device 33 may communicate with a lock sensor 35 (SENS), for example a position sensor detecting the position of the lever 14 or other, in order to detect the unlocked or locked state of the hinge mechanisms 10.

The electric control device 33 is normally in backrest locking mode and can be actuated by a user (via the control interface 33a) to backrest tilt adjustment mode 2. When the user stops acting on the control interface 33a, the control device 33 returns to backrest locking mode 2.

In backrest locking mode, the control member 14a is in the locking position and the motorized adjustment device 11 is not actuated.

When the electric control device 33 enters backrest tilt adjustment mode 2 when so commanded by the control interface 33a, said electric control device 33 synchronously (i.e. in a coordinated way) controls the motorized adjustment device 11 and the electric actuation device 30 so that the electric actuation device 30 moves the control member 14 to the unlocking position and the motorized adjustment device 11 is actuated to adjust the tilt of the backrest 2.

In particular, the electric control device 33 is suitable for:
when the user actuates the electric control device 33 in order to switch from backrest locking mode to backrest tilt adjustment mode, first causing the control member 14 to be moved by the electric actuation device 30 to the unlocking position and then actuating the motorized adjustment device 11 to adjust the tilt of the backrest 2,
when the user stops actuating the electric control device 33 in order to switch from backrest tilt adjustment mode to backrest locking mode, first stopping the motorized adjustment device 11 and then causing the control member 14a to switch to the locking position.

For example, the electric control device 33 may be configured for, when the user actuates the electric control device 33 to switch from backrest locking mode to backrest tilt adjustment mode, not actuating the motorized adjustment device 11 to adjust the tilt of the backrest 2 as long as the lock sensor 35 has not detected the unlocked state of the hinge mechanism 10 (optionally, the motorized adjustment device 11 can be actuated to adjust the tilt of the backrest 2 after a certain delay (for example a few tenths of seconds) after the lock sensor 35 has detected the unlocked state of the hinge mechanism 10).

In backrest tilt adjustment mode, the electric control device 33 is adapted for selectively controlling the electric motor M in two opposite directions, in order to tilt the backrest 2 backward or forward.

Alternatively, the electric control device 33 could be adapted for simply controlling the unlocking of the hinge mechanisms 10 and not the electric motor M in a first adjustment direction, and to control both the unlocking of the hinge mechanisms 10 and the rotation of the electric motor M in a second adjustment direction opposite to the first direction. This variant is possible in particular when the seat 1 comprises a return spring (not shown) biasing the backrest 2 to pivot in the first direction (in particular towards the front).

Furthermore, the hinge mechanisms 10 allow locking the backrest at predetermined tilt angles separated from each other by a constant increment, which may be for example about 1.875 degrees. The electric control device 33 can thus be adapted so that the electric motor M is stopped only in positions of the front connecting rods that correspond to angular locking positions of the backrest. For example, the electronic controller 33b can be configured (for example programmed) to determine the angular position of the backrest 2 at every moment during operation of the motor M.

The user of the seat can thus adjust the tilt of the backrest 2 in a motorized manner by actuating the control interface 33a, for example in order to place the backrest 2 in one of the angular positions of FIGS. 3 to 5 or in another angular position.

This motorized adjustment can be done using standard hinge mechanisms, which are very resistant but inexpensive as they have no gears. Similarly, it is possible to use a motorized adjustment device 11 without the locking device conventionally provided for equipping geared motors which must withstand significant stresses, because the locking function is ensured by the hinge mechanism or mechanisms 10. The motorized adjustment device 11 can thus also be inexpensive.

Figure 11:
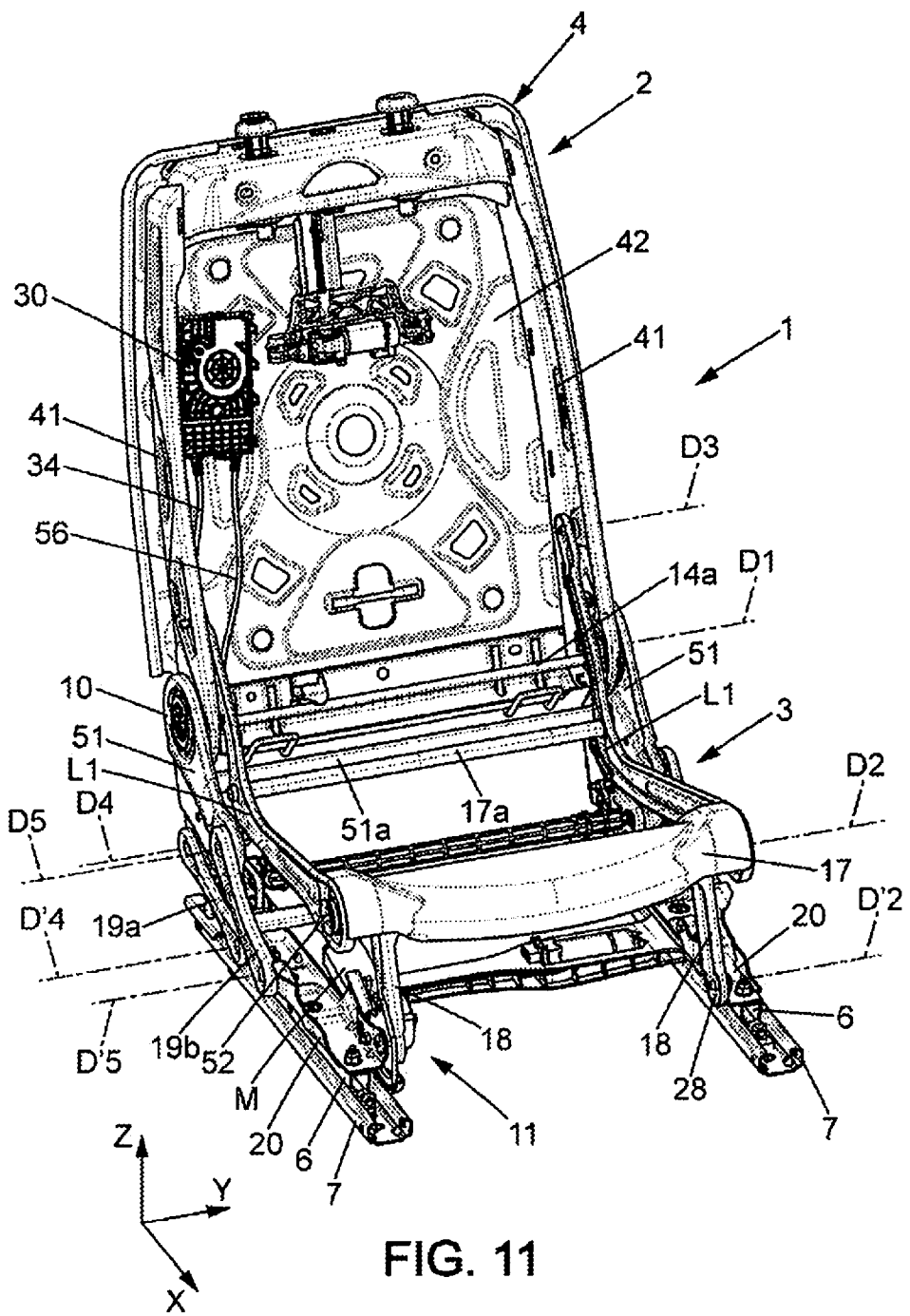
FIG. 11 is a perspective three-quarter front view of a vehicle seat according to a second embodiment.
Figure 12:
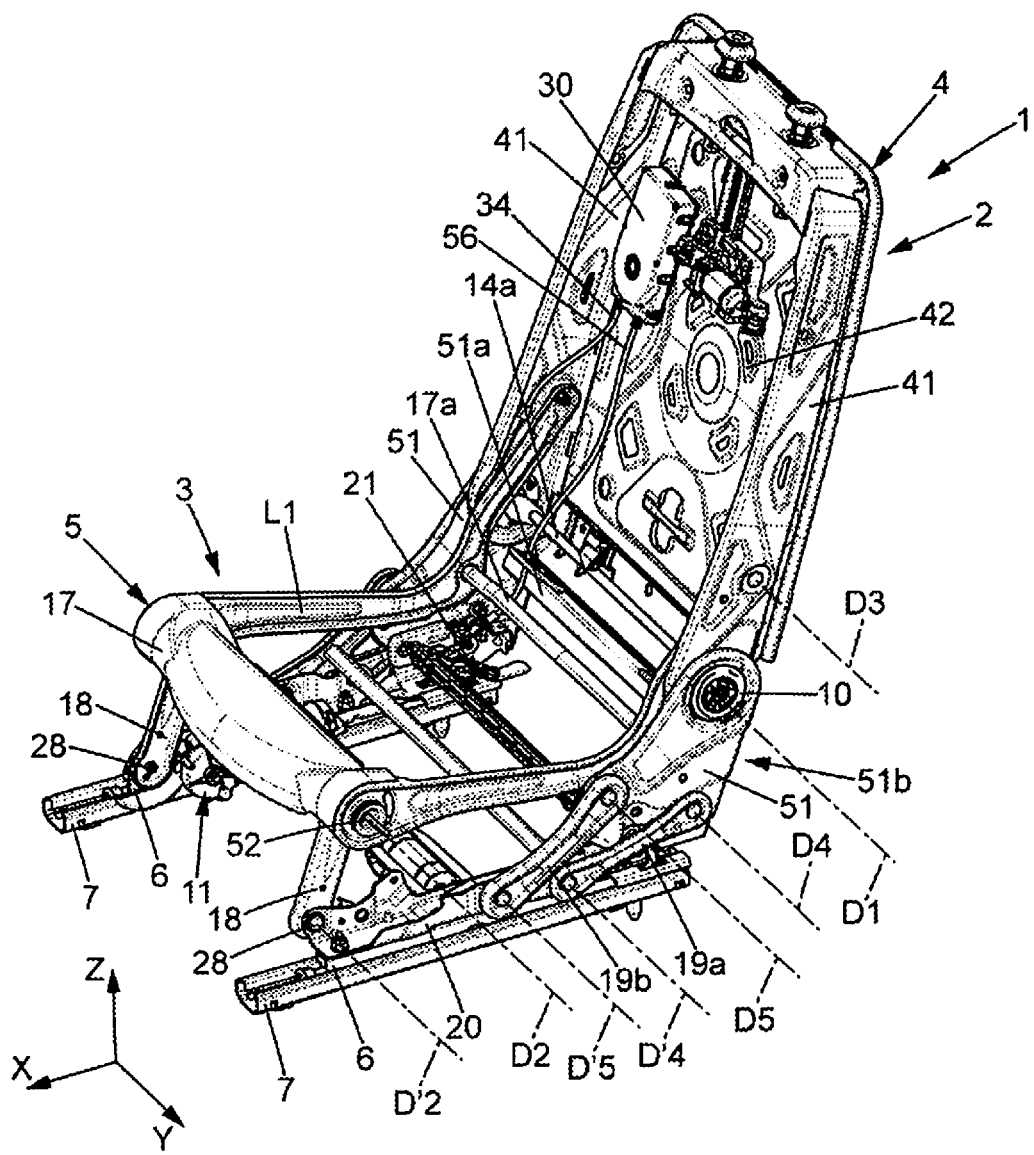
FIG. 12 is a perspective three-quarter front view of the vehicle seat of FIG. 11, viewed from another direction.
Figure 13:
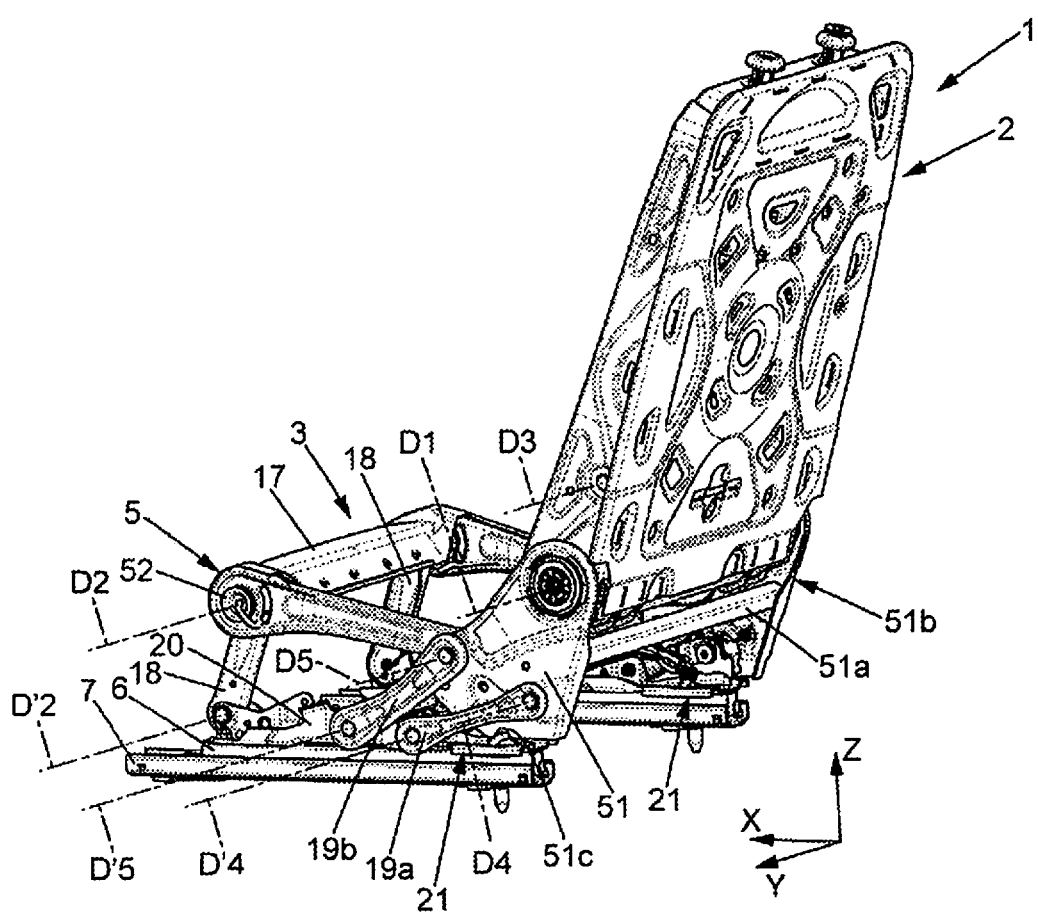
FIG. 13 is a perspective three-quarter rear view of the vehicle seat of FIG. 11.
Figure 14:
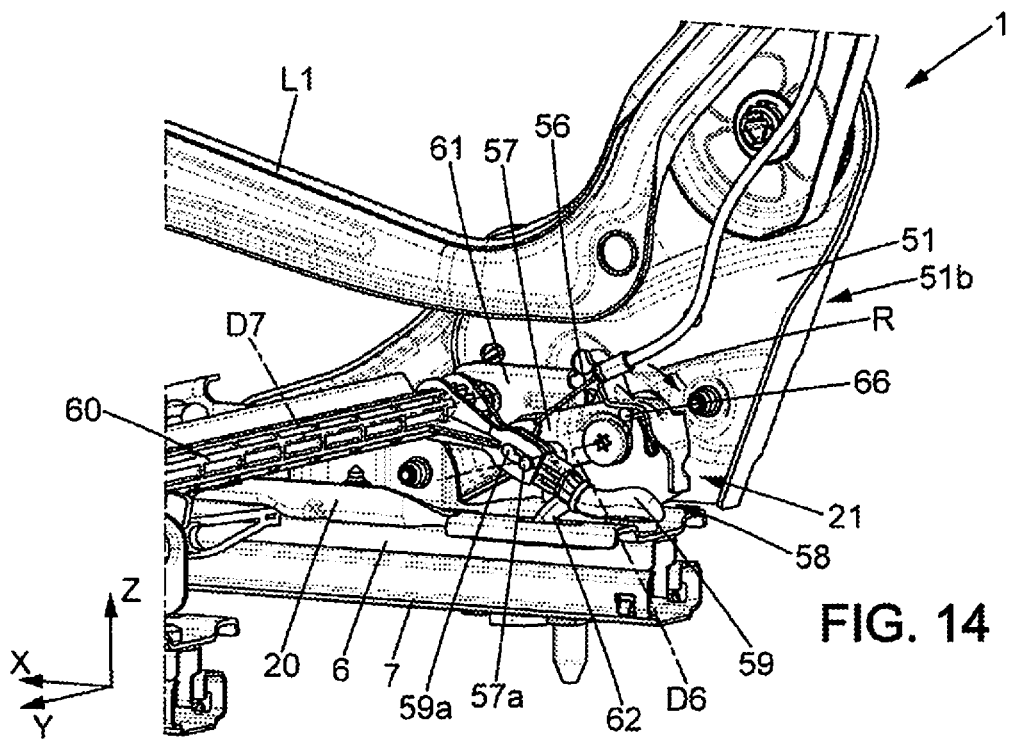
FIG. 14 is a detailed perspective view showing the anchoring mechanism of the backrest support of the seat of FIG. 11.
Figure 15:
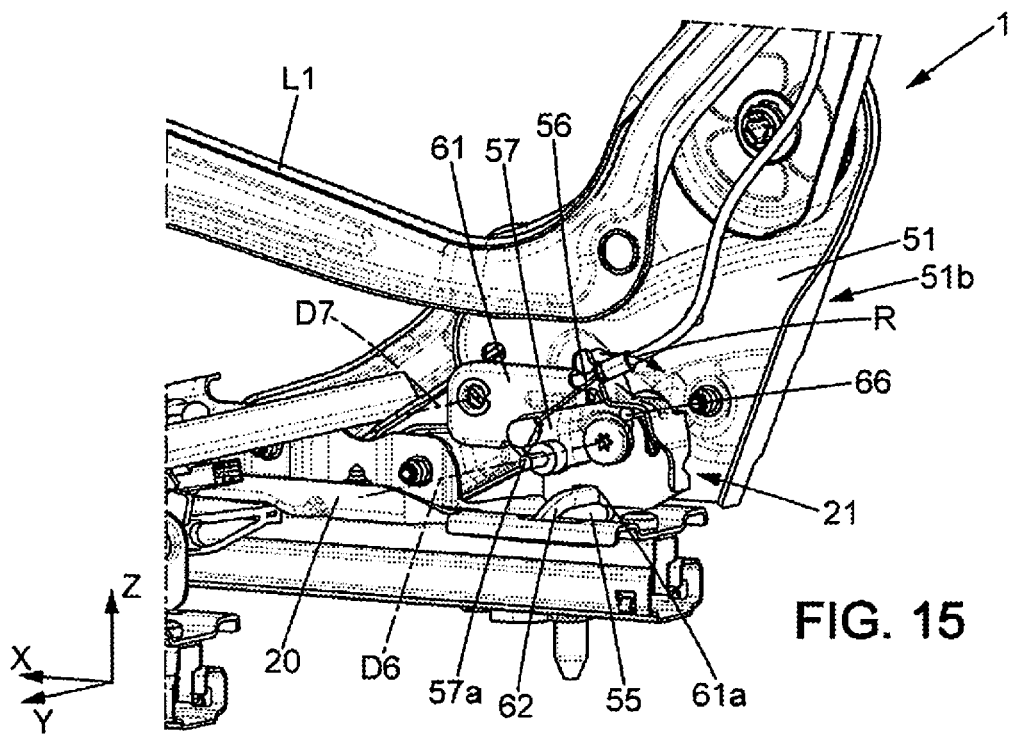
FIG. 15 is a view similar to FIG. 14, in which some elements have been omitted to better show an example of an anchoring mechanism used in the seat of FIG. 11.
Figure 16:
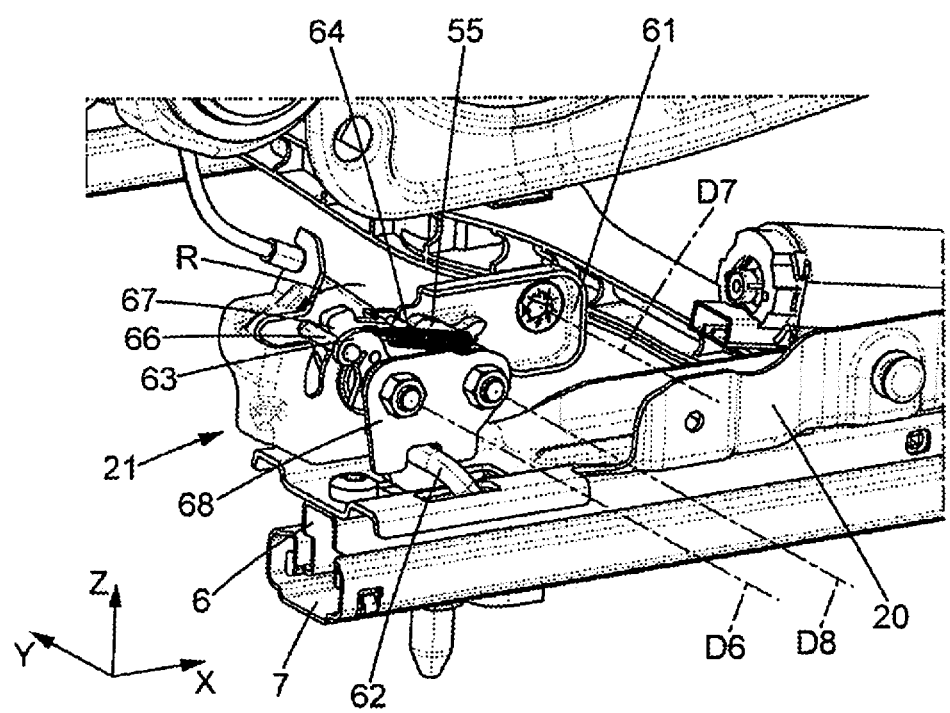
FIG. 16 is a view similar to FIG. 15 but viewed from the opposite direction, in which some elements have been omitted to better show the example of an anchoring mechanism.
Figure 17:
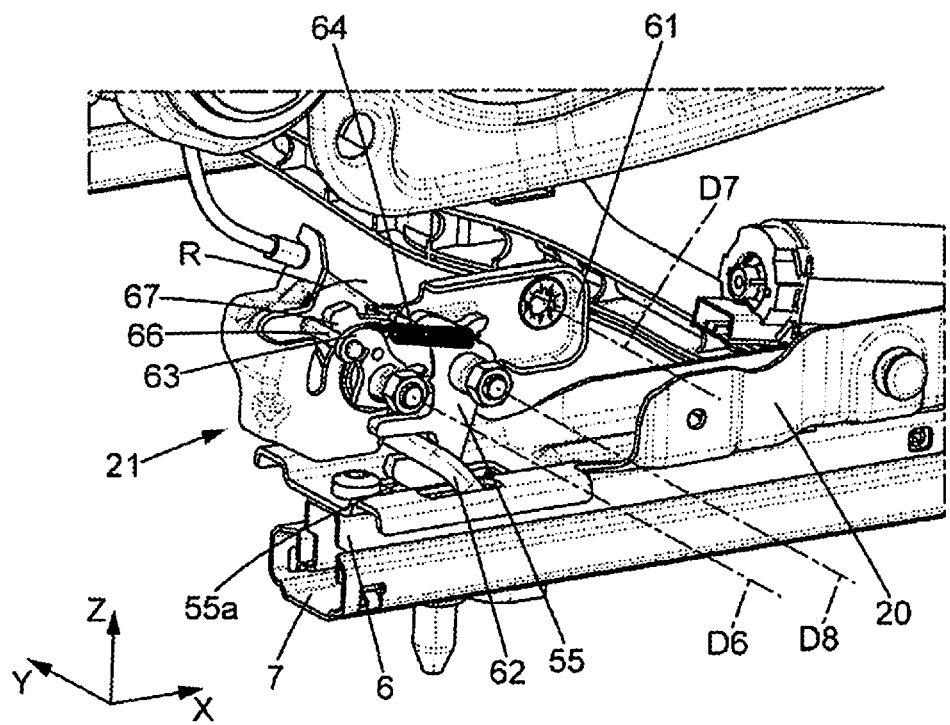
FIG. 17 is a view similar to FIG. 16, in which other elements have been omitted to better show the example of an anchoring mechanism.
Figure 18:
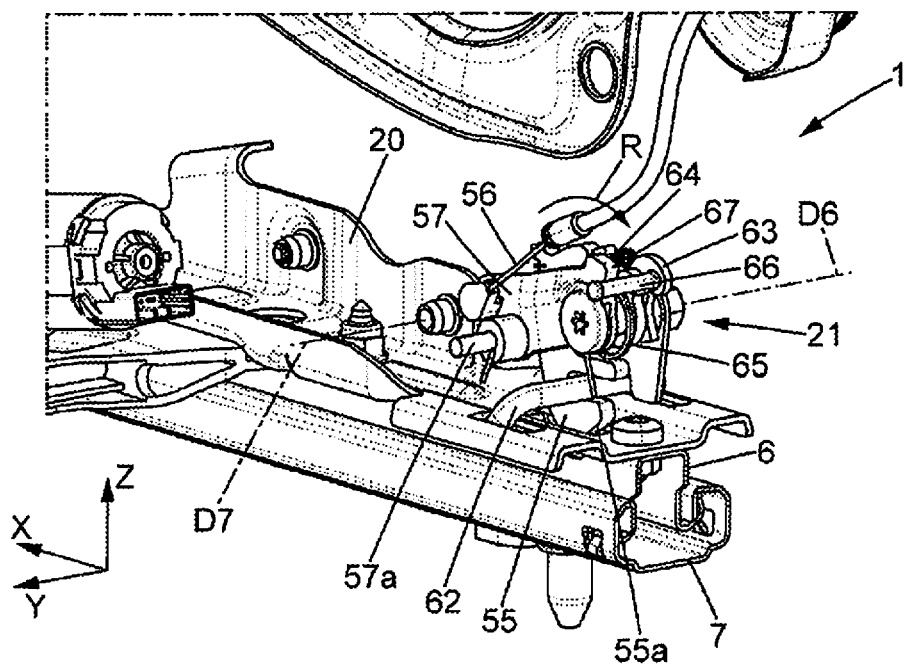
FIG. 18 is a view similar to FIG. 16 but viewed from the opposite direction, in which further elements have been omitted to better show the example of an anchoring mechanism.

In the second embodiment, represented in FIGS. 11 to 13, all the elements and the operation described above are identical or similar; they will not be described again here.

Figure 20:
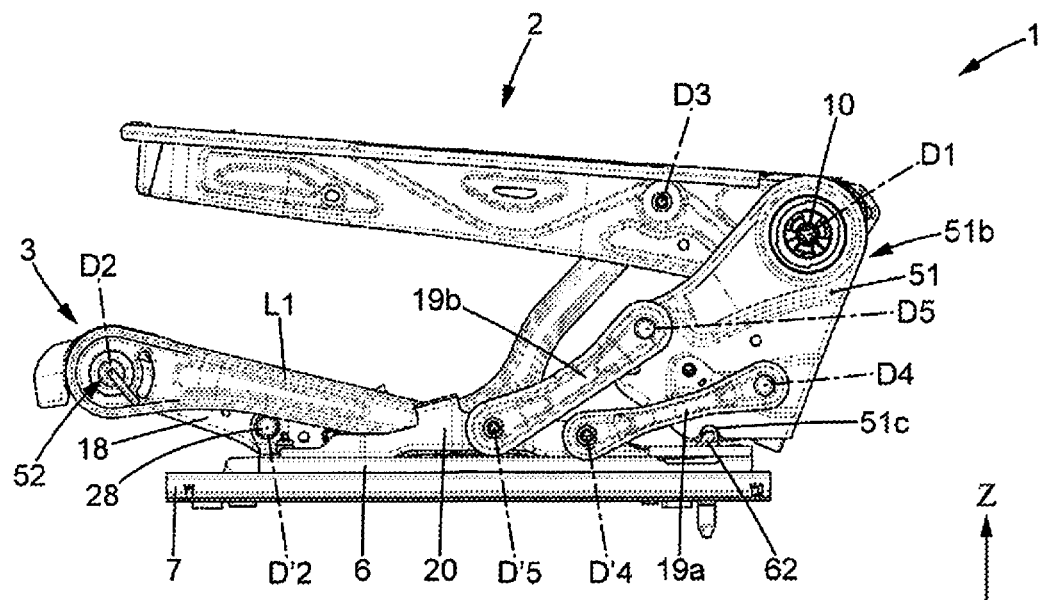
FIG. 20 is a side view of the seat of FIG. 11, in the "flat floor" position.

As above, control by the electric actuation device 30 of the motorized adjustment device 11, synchronously with the hinge mechanism 10, allows adjusting the forward or backward tilt of the backrest 2 from the nominal position (FIGS. 11 to 12), for example in the positions shown in FIGS. 3 to 5, or in the horizontal forward-folded position of the backrest 2 (FIG. 20—Flat floor position).

As explained above for the first embodiment, the release of the anchoring device 21 also allows folding the backrest 2 forward due to the motorized adjustment device 11 which controls the front connecting rod 18. Reference is hereby made to French Patent Application No. 1758802 for disclosure related to anchor device that allows folding the backrest forward, the disclosure of which is hereby incorporated in its entirety. It is thus possible to place the seat 1 in an advanced position where the backrest support (51b) is moved at least partially forward, in particular in order to access seats in the vehicle that are behind the seat 1.

The rear connecting rods 19a, 19b make it possible to mount the backrest support 51b so it is movable on the base 6, between a rest position and an advanced position where at least a portion of said backrest support 51b is moved forward relative to the rest position where said backrest support 51b is anchored on the base 6 by the anchoring mechanism 21. The rear connecting rods 19a, 19b can be arranged so that the backrest support 51b and the backrest 2 tilt forward at an angle comprised between 15 and 40 degrees and rise upward when the backrest support 51b moves from the rest position to the forward position.

The anchoring mechanism 21 is movable between an anchoring position in which said anchoring mechanism 21 is suitable for anchoring the backrest support 51b on the base 6 in the rest position of the backrest support 51b, and a release position in which said anchoring mechanism 21 is suitable for releasing the backrest support 51b from the base 6.

The anchoring mechanism 21 may comprise an anchoring member 55 which may be for example a hook 55 as in the example shown in more detail in FIGS. 14 to 18, or a peg lockable by beads, or other means.

The anchoring mechanism 21 may be actuated by the abovementioned electric actuation device 30, for example by means of a Bowden or other type of cable 56. The electric actuation device 30 is suitable for actuating either the abovementioned cable 34 or cable 56, depending on the commands received from the electric control device 33. The cables 34 and/or 56 may be replaced by rod transmissions.

The anchoring mechanism 21 may comprise a control member 57 connected to the cable 56, for controlling the changing of the anchoring mechanism to the release position. The control member may for example be a lever mounted so as to pivot on a transverse axis of rotation D6 (parallel to the Y direction) integral with the backrest support 51b.

In addition, the anchoring mechanism 21 may be released by a manual control device 58 accessible from the rear of the seat 1, in particular to allow a user sitting behind the seat 1 to release the anchoring member 21. In the event of an accident, the user sitting behind the seat 1 can thus manually push the seat into the position of FIG. 21 for an emergency exit from the vehicle.

The manual control device 58 may for example comprise a manual control lever 59 accessible from the rear of the seat 1, the manual control lever 59 being mounted integral with the backrest support 51b so as to pivot integrally about a transverse axis of rotation D7 (parallel to the Y direction) and connected to the control member 57 so that a pivoting of the manual control lever 59 also causes a pivoting of the control member 57.

For example, the manual control lever 59 may comprise a slot 59a engaged on a transverse pin 57a of the control member 57.

When the seat comprises two anchoring mechanisms 21 respectively located in proximity to the two flanges 51, they can be synchronously controlled by a single cable 56, for example by means of a crossbar 60 which extends transversely along axis of rotation D7 and which is pivotally mounted on the backrest support 51b on each side of the seat, this crossbar 60 being connected to the control member 57 opposite to the one represented in FIGS. 14-18, by a lever similar to the abovementioned lever 59 (possibly shorter if the second lever is not intended to be operable by a user).

Optionally, the crossbar 60 may be rotatable, at each side of the seat, on an additional flange 61 integral to the corresponding flange 51 and arranged towards the inside of the seat relative to flange 51. The control member 57 may also be rotatable on this additional flange 61.

The anchoring member 55 may catch on a receiving member 62 integral with the base 6. When the anchoring member 55 is a hook as in the example shown, mounted so as to pivot for example on the additional flange 61 about a transverse axis of rotation D8 (parallel to the Y direction), the receiving member 62 may for example be a rigid wire or a bar also extending transversely in the Y direction, and integral for example with the abovementioned support 20.

The flanges 51, 61 may optionally comprise downward-directed notches, respectively 51c (FIG. 13) and 61a, adapted to engage the receiving member 62.

The hook 55 is shaped so that it itself engages, by a cam effect of its inclined lower edge 55a, on the receiving member 62 when the backrest support returns to the rest position after having been in the advanced position. To enable this engagement, the hook 55 is not directly connected to the control member 57; it is controlled by a control cam 63 pivoting about axis of rotation D6 and is resiliently biased towards the anchoring position, for example by a tension spring 64 mounted between the hook 55 and the control cam 63.

The control member 57 is also resiliently biased towards a rest position, for example by a torsion spring 65 mounted between the control member 57 and the additional flange 61.

The control cam 63 is provided with a transverse rigid finger 66 which an edge 67 of the control member 57 bears against when the control member 57 is actuated in the angular direction R by the cable 56, which rotates the control cam 63 in direction R, this control cam 63 thus moving the hook 55 in angular direction R to bring it to the release position. The backrest support 51b is thus released from the base 6 and can thus move towards the advanced position.

When the backrest support 51b returns to the rest position, the hook 55 pivots in direction R by the cam effect of its edge 55a against the receiving member 62 and drives the control cam 63 along with it in direction R as well, said control cam then not interfering with the control member 57 which remains stationary, then the hook 55 returns to the anchoring position by locking on the receiving member under the effect of the spring 64.

The hook 55 and the control cam 63 may be covered, towards the flange 51, by a plate 68 integral with the additional flange 61.

Figure 19:
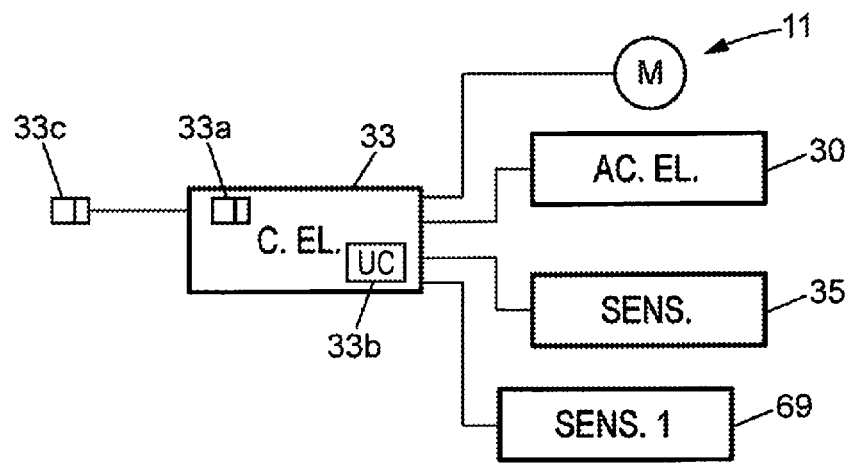
FIG. 19 is a block diagram of the electrical portions of the seat of FIG. 11.

As represented in FIG. 19, the electric control device 33 may further be connected in particular to a sensor 69 (SENS 1) which detects the state of the anchoring mechanism 21 (anchoring/release position).

Figure 21:
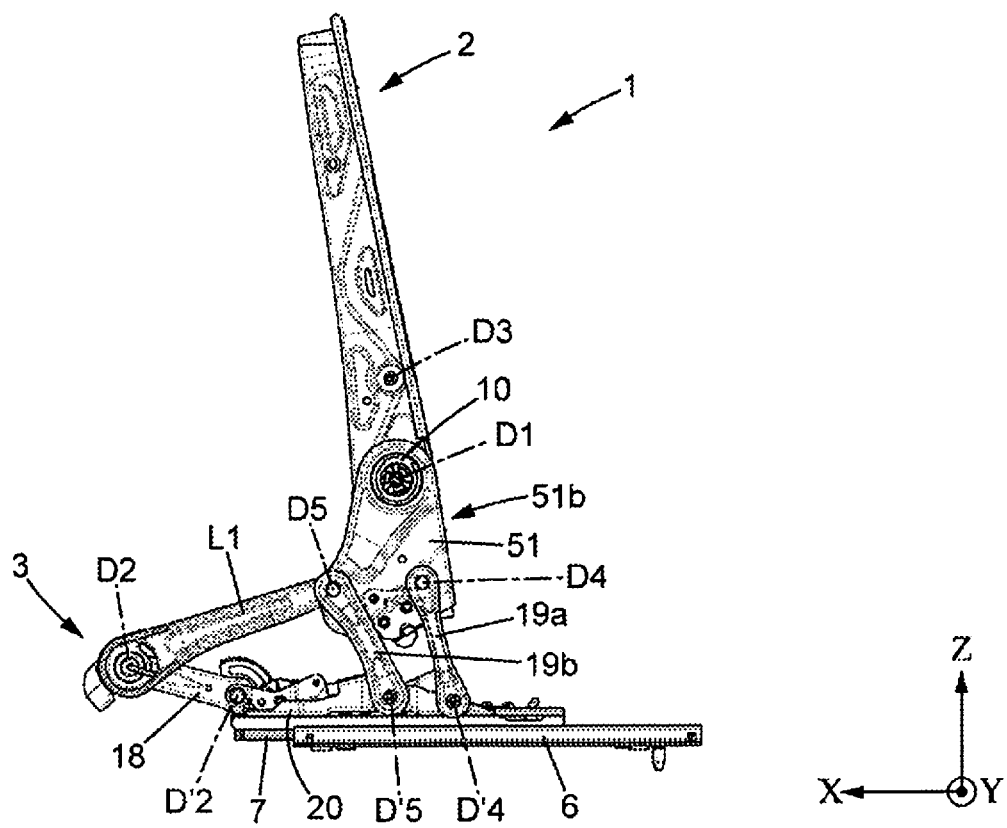
FIG. 21 is a side view of the seat of FIG. 11, in the advanced position of the backrest support (here a position for accessing the rear seats)

Thus, in the second embodiment, the electric control device 33 can operate in three modes:
  locking mode: the seat 1 is immobilized, the motorized adjustment device 11 and the electric actuator 30 are not actuated;
  backrest tilt adjustment mode: as explained in the first embodiment, upon actuation of the control interface 33a, the electric control device 33 first unlocks the hinge mechanism 10 via the electric actuation device 30 (leaving the anchoring mechanism 21 in the anchoring position) then actuates the motorized adjustment device 11 to achieve a backrest tilt in order to reach a comfortable adjustment position (see for example FIGS. 3 to 5) or the "flat floor" position of FIG. 20 (it should be noted that an additional control interface (not shown), for example a control button, may be provided for controlling the pivoting to the "flat floor" position of FIG. 20);

backrest support 51b movement mode: upon actuation of the additional control interface 33c, the electric control device 33 first moves the anchoring mechanism 21 to the release position via the electric actuation device 30 (leaving the hinge mechanism 10 in the locked position) then actuates the motorized adjustment device 11 to pivot the front connecting rods 18 forward to the advanced position of the backrest support 51b visible in FIG. 21, which in particular allows access to behind the seat 1.

Figure 22:
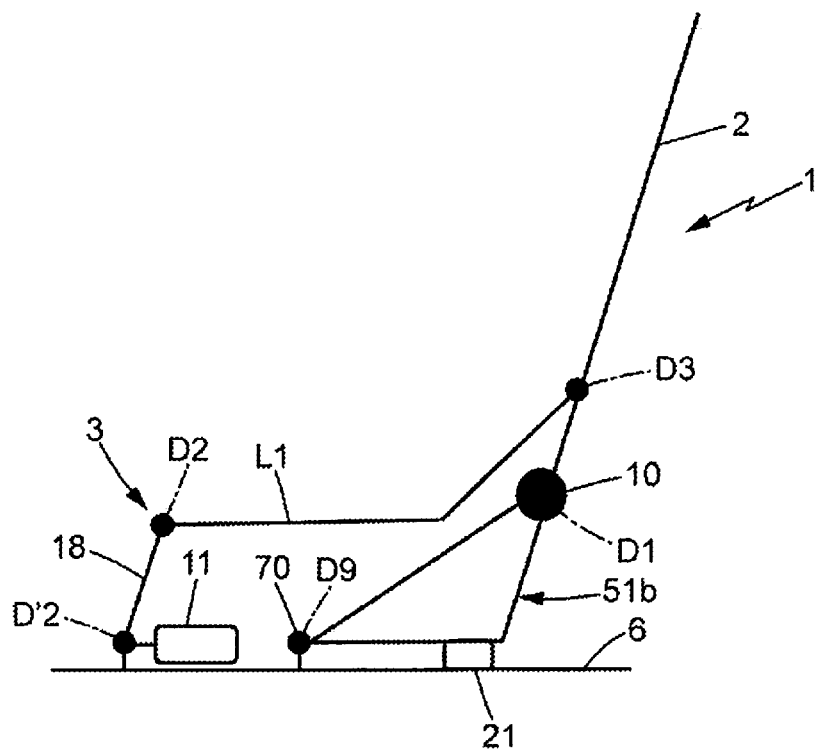
FIG. 22 is a schematic view of a seat according to a third embodiment, in a nominal position.
Figure 23:
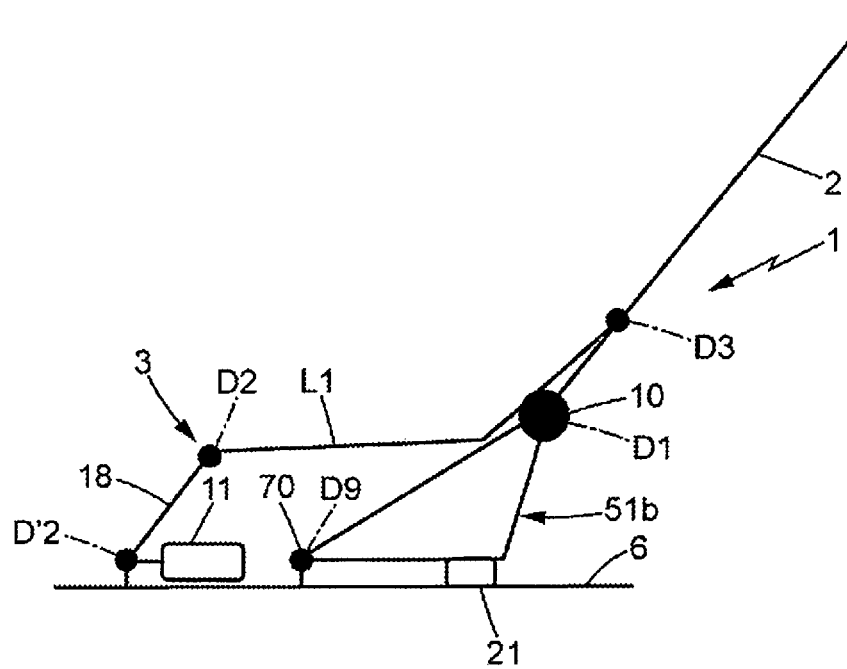
FIG. 23 is a schematic view of the seat of FIG. 22, in a comfort position.
Figure 24:
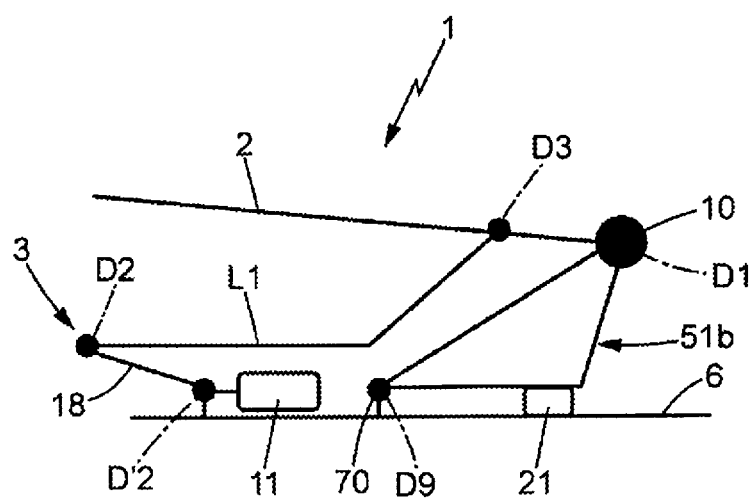
FIG. 24 is a schematic view of the seat of FIG. 22, in the "flat floor" position.
Figure 25:
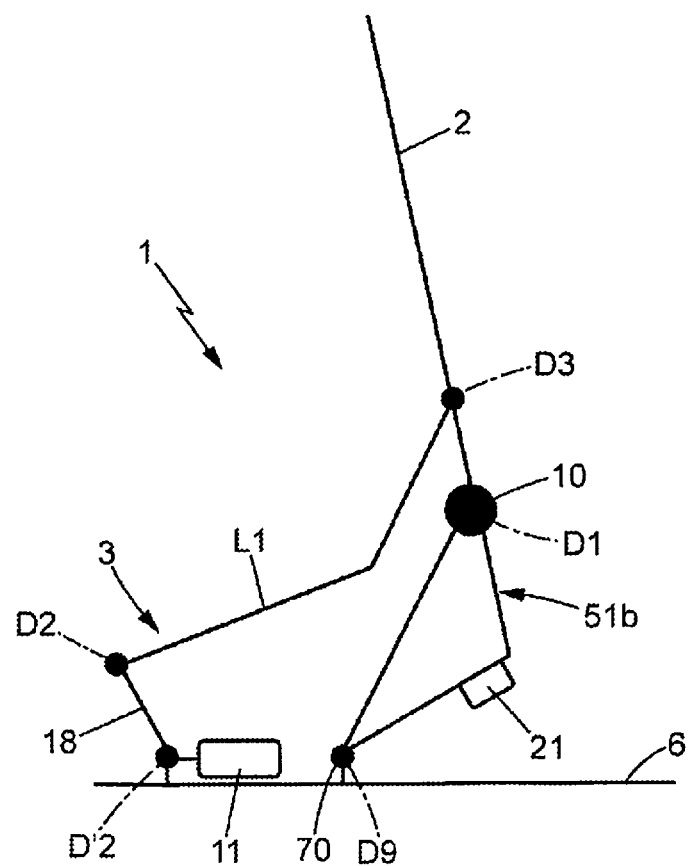
FIG. 25 is a schematic view of the seat of FIG. 22, in the advanced position of the backrest support (here a position for accessing the rear seats)

The third embodiment, represented in FIGS. 22 to 25, differs from the second embodiment in that the backrest support 51b is not mounted on rear connecting rods, but is mounted on the base 6 by a pivot 70 so as to pivot about a transverse axis of rotation D9. The operation is the same as in the second embodiment: the electric control device 33 can operate according to the three modes already explained above in order to:

adjust the tilt of the backrest 2 from the nominal position of FIG. 22, either rearward, to a comfort position shown in FIG. 23, or forward, possibly to the flat floor position of FIG. 24;

or place the seat in the advanced position of the backrest support 51b as represented in FIG. 25, where the backrest support 51b pivots forward with the backrest 2, about axis of rotation D9.

Figure 26:
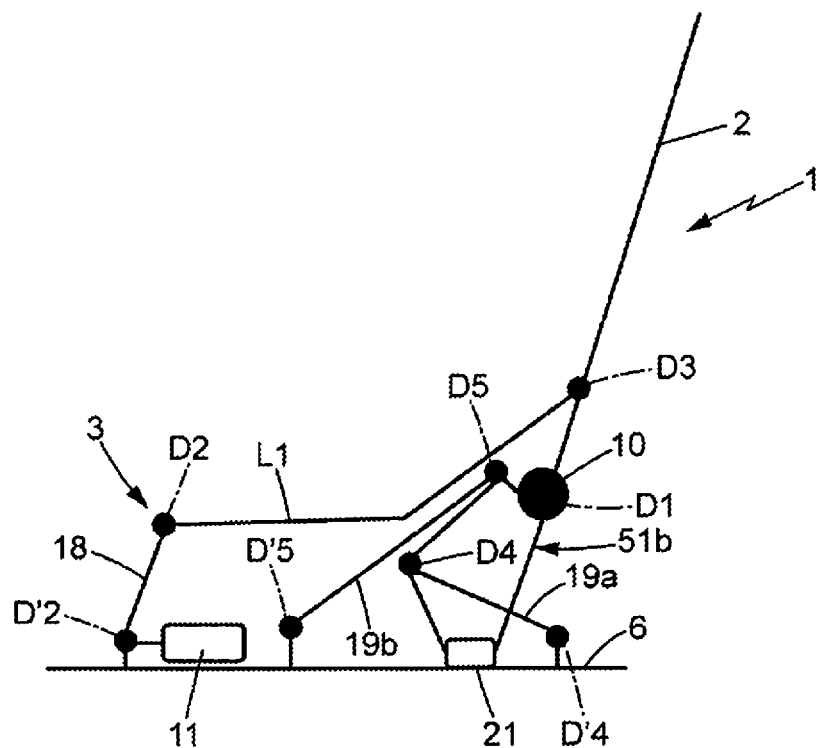
FIG. 26 is a schematic view of a seat according to a fourth embodiment, in a nominal position.
Figure 27:
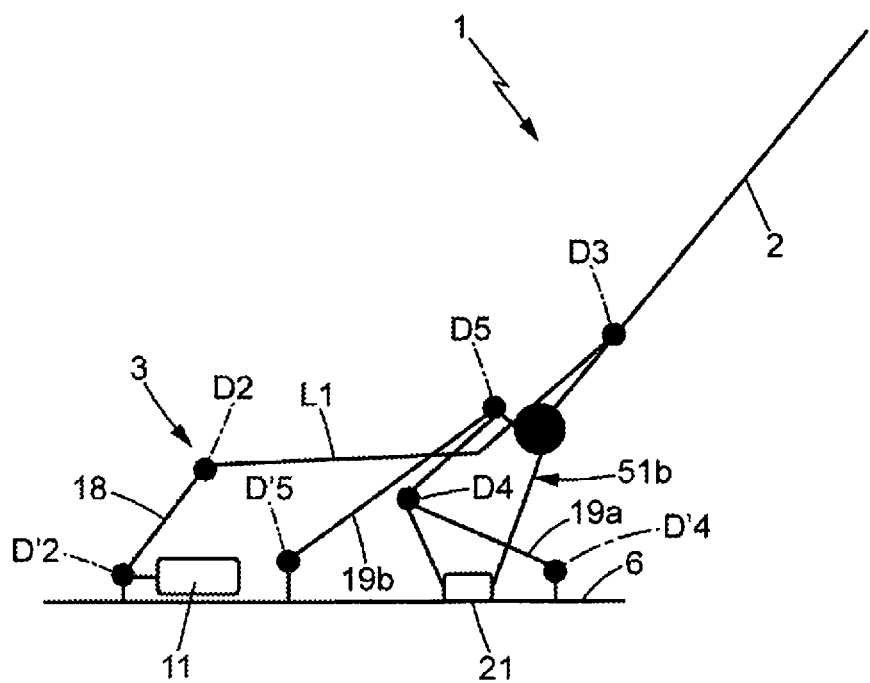
FIG. 27 is a schematic view of the seat of FIG. 26, in a comfort position.
Figure 28:
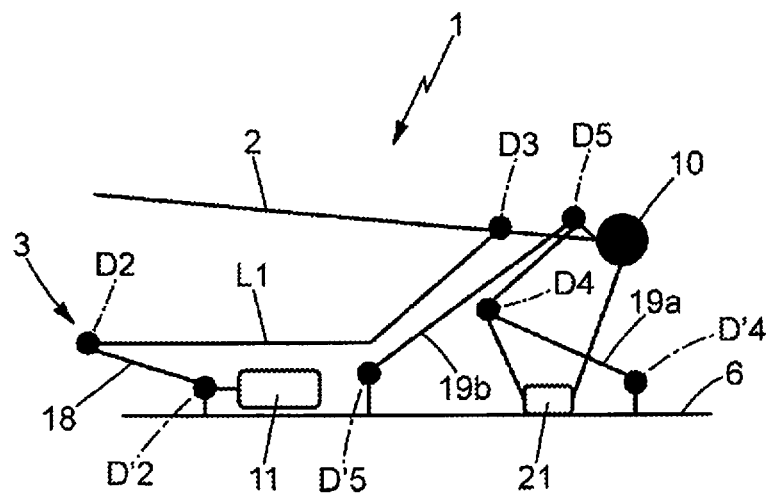
FIG. 28 is a schematic view of the seat of FIG. 26, in the "flat floor" position.
Figure 29:
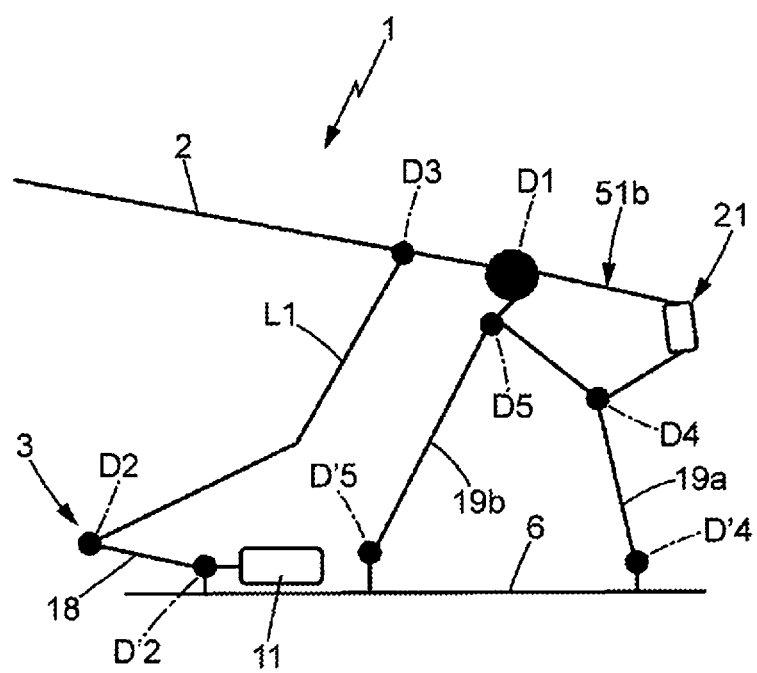
FIG. 29 is a schematic view of the seat of FIG. 26, in the advanced position of the backrest support (here a console position).

The fourth embodiment, represented in FIGS. 26 to 29, differs from the second embodiment in that the rear rods 19a, 19b are oriented in intersecting directions in the normal position of use of the seat, instead of being substantially parallel. The operation is similar to that of the second embodiment: the electric control device 33 can operate according to the three modes already explained above in order to:

adjust the tilt of the backrest 2 from the nominal position of FIG. 26, either rearward, to a comfort position shown in FIG. 27, or forward, possibly to the "flat floor" position of FIG. 28;

or place the seat in the advanced position of the backrest support 51b as represented in FIG. 29, where the backrest support 51b pivots forward with the backrest 2 substantially to the horizontal, while rising under the effect of the movement of the rear rods 19a, 19b (console position).

One aim of the present description is to propose a system providing more comfort for the user while ensuring great safety, particularly in the event of an accident involving the vehicle.

For this purpose, the system further comprises:

a motorized adjustment device with an electric motor, suitable for adjusting the angular position of the backrest, said motorized adjustment device being mechanically connected to the backrest independently of the hinge mechanism, an electric actuation device suitable for moving the control member of the hinge mechanism, an electric control device which is normally in locking mode and which is operable by a user in backrest tilt adjustment mode, said electric control device being suitable for synchronously (i.e. in a coordinated way) controlling the motorized adjustment device and the electric actuation device so as to: in backrest tilt adjustment mode, cause the control member to be moved by the electric actuation device into the unlocking position and actuate the motorized adjustment device to adjust the tilt of the backrest, and in locking mode, leave the control member in the locking position and not actuate the motorized adjustment device.

The tilt of the backrest can thus be adjusted in a motorized manner, while maintaining the generally high mechanical strength of lockable hinge mechanisms, which usually assume a manual actuation of the backrest in order to adjust its tilt. In addition, this high mechanical strength can be obtained even if using an inexpensive motorized adjustment device that has no device for locking in position. The system therefore makes it possible where appropriate to achieve a motorized backrest tilt adjustment which is very strong and relatively inexpensive.

In illustrative embodiments, one or more of the following may also be used:

the motorized adjustment device is of the reversible type, not locking the backrest when said motorized adjustment device is not actuated;

the electric control device (33) is suitable for:

when the user actuates the electric control device to switch from locking mode to backrest tilt adjustment mode, first causing the control member to be moved by the electric actuation device to the unlocking position and then actuating the motorized adjustment device to adjust the tilt of the backrest, when the electric control device returns from backrest tilt adjustment mode to locking mode, first stopping the motorized adjustment device and then causing the control member to move to the locking position;

said hinge mechanism comprises a lock sensor suitable for detecting said unlocked state of said hinge mechanism and communicating with the electric control device, said electric control device being suitable for, when the user actuates the electric control device to switch from locking mode to backrest tilt adjustment mode, not actuating the motorized adjustment device to adjust the tilt of the backrest as long as the lock sensor does not detect said unlocked state of said hinge mechanism;

the electric control device is configured to return automatically to locking mode when the user stops actuating said electric control device;

the system further comprises a central processing unit suitable for controlling the motorized adjustment device in successive regular increments corresponding to locking increments of the hinge mechanism;

the seating portion is connected to a base by two front connecting rods which themselves are pivotally mounted on said base, and the motorized adjustment device is mounted so as to pivot the front connecting rods on the base;

the seating portion comprises:

two side flanges mounted on the base and on which the backrest is pivotally mounted by said hinge mechanism, and two curved connecting rods pivotally mounted on the backrest above said hinge mechanism and each extending to a front end, the front ends of the curved connecting rods being pivotally mounted respectively on the two front connecting rods;

the motorized adjustment device comprises a pinion which meshes with a toothed sector integral with one of the front connecting rods;

the electric control device is part of a seat comprising the seating portion and the backrest;

the system further comprises a control interface enabling a user to actuate the electric control device, and said control interface is part of a seat comprising the seating portion and the backrest;

the motorized adjustment device is connected to at least one of the front connecting rods,
the system further comprising:
a backrest support on which the backrest is pivotally mounted, the backrest support being mounted on the base so as to move between a rest position and an advanced position where at least a portion of said backrest support is moved forward relative to the rest position,
an anchoring mechanism, movable between an anchoring position in which said anchoring mechanism is suitable for anchoring the backrest support on the base in the rest position of the backrest support and a release position in which said anchoring mechanism is suitable for releasing the backrest support from the base,
the electric control device being suitable for controlling said anchoring mechanism and being operable by a user to function in backrest support movement mode, said electric control device being suitable for synchronously (i.e. in a coordinated way) controlling the motorized adjustment device and the anchoring device so as to:
in backrest support movement mode, cause the anchoring device to move to the release position and actuate the motorized adjustment device to pivot the front rods forward while leaving the control member in the locking position, and
in locking mode, leave the anchoring mechanism in the anchoring position and not actuate the motorized adjustment device,
wherein said electric control device is further adapted to leave the anchoring device in the anchoring position when said electric control device is operating in tilt adjustment mode,
and wherein said electric control device is further adapted to fold down the seat backrest substantially horizontally onto the seating portion of the seat by causing movement of the control member into the unlocking position by means of the electric actuation device and actuating the motorized adjustment device to pivot the front connecting rods forward while leaving the anchoring device in the anchoring position;
the system further comprises a manual control device suitable for allowing a user to set the anchoring device manually in the release position, the reversible type of motorized adjustment device then enabling the user to move the base to the advanced position;
the manual control device is accessible from the rear of the seat backrest;
the electric control device controls the anchoring mechanism by means of the electric actuation device, and said electric actuation device is suitable for selectively controlling either the control member of the hinge mechanism or the anchoring mechanism;
the anchoring mechanism comprises an anchoring member suitable for catching on a receiving member integral with the base, the anchoring member itself being suitable for engaging with the receiving member when the backrest support returns to the rest position with the anchoring mechanism in the anchoring position;
the backrest support is pivotally mounted on the base;
the backrest support is mounted on the base by means of rear connecting rods;
the rear connecting rods are arranged so that the backrest support and the seat backrest tilt forward at an angle comprised between 15 and 40 degrees and rise upward when the backrest support moves from the rest position to the advanced position;
the rear connecting rods are arranged so that the backrest support and the seat backrest swing forward substantially to the horizontal and rise upward when the backrest support moves from the rest position to the advanced position.

The invention claimed is:
1. A system comprising:
a seating portion of a seat,
a backrest of said seat, pivotally mounted relative to the seating portion,
at least one hinge mechanism pivotally connecting the backrest to the seating portion and suitable for adjusting an angular position of the backrest relative to the seating portion, said hinge mechanism being controlled by a control member movable between:
a locking position in which said control member places said hinge mechanism in a locked state immobilizing the backrest, and
an unlocking position in which said control member places said hinge mechanism in an unlocked state allowing the tilting of the backrest, said control member further being resiliently biased towards the locking position,
said system further comprising:
a motorized adjustment device with an electric motor, suitable for adjusting the angular position of the backrest, said motorized adjustment device being mechanically connected to the backrest independently of the hinge mechanism,
an electric actuation device suitable for moving the control member of the hinge mechanism,
an electric control device which is normally in locking mode and which is operable by a user in backrest tilt adjustment mode, said electric control device being suitable for controlling the motorized adjustment device and the electric actuation device so as to:
in backrest tilt adjustment mode, cause the control member to be moved by the electric actuation device into the unlocking position and actuate the motorized adjustment device to adjust the tilt of the backrest, and
in locking mode, leave the control member in the locking position and not actuate the motorized adjustment device,
wherein the seating portion is connected to a base by two front connecting rods which themselves are pivotally mounted on said base, and the motorized adjustment device is mounted so as to pivot the front connecting rods on the base,
wherein the seating portion comprises:
two side flanges mounted on the base and on which the backrest is pivotally mounted by said hinge mechanism,
and two curved connecting rods pivotally mounted on the backrest above said hinge mechanism and each extending to a front end, the front ends of the curved connecting rods being pivotally mounted respectively on the two front connecting rods, and
wherein the motorized adjustment device is connected to at least one of the front connecting rods, the system further comprising:
a backrest support on which the backrest is pivotally mounted, the backrest support being mounted on the base so as to move between a rest position and an advanced position where at least a portion of said backrest support is moved forward relative to the rest position, an anchoring mechanism, movable between an anchoring position in which said anchoring mechanism is suitable for anchoring the backrest support on the base in the rest position of the backrest support and a release position in which said anchoring mechanism is suitable for releasing the backrest support from the base, the electric control device being suitable for controlling said anchoring mechanism and being operable by a user to function in backrest support movement mode, said electric control device being suitable for controlling the motorized adjustment device and the anchoring device so as to:

in backrest support movement mode, cause the anchoring device to move to the release position and actuate the motorized adjustment device to pivot the front rods forward while leaving the control member in the locking position, and in locking mode, leave the anchoring mechanism in the anchoring position and not actuate the motorized adjustment device, wherein said electric control device is further adapted to leave the anchoring device in the anchoring position when said electric control device is operating in tilt adjustment mode, and wherein said electric control device is further adapted to fold down the seat backrest substantially horizontally onto the seating portion of the seat by causing movement of the control member into the unlocking position by means of the electric actuation device and actuating the motorized adjustment device to pivot the front connecting rods forward while leaving the anchoring device in the anchoring position.

2. The system of claim 1, wherein the motorized adjustment device is of the reversible type, allowing pivotable movement of the backrest when said motorized adjustment device is not actuated.

3. The system of claim 1, wherein the electric control device is suitable for:

when the user actuates the electric control device to switch from locking mode to backrest tilt adjustment mode, first causing the control member to be moved by the electric actuation device to the unlocking position and then actuating the motorized adjustment device to adjust the tilt of the backrest, when the electric control device returns from backrest tilt adjustment mode to locking mode, first stopping the motorized adjustment device and then causing the control member to move to the locking position.

4. The system of claim 3, wherein said hinge mechanism comprises a lock sensor suitable for detecting said unlocked state of said hinge mechanism and communicating with the electric control device, said electric control device being suitable for, when the user actuates the electric control device to switch from locking mode to backrest tilt adjustment mode, not actuating the motorized adjustment device to adjust the tilt of the backrest as long as the lock sensor does not detect said unlocked state of said hinge mechanism.

5. The system of claim 1, wherein the electric control device is configured to return automatically to locking mode when the user stops actuating said electric control device.

6. The system of claim 1,
further comprising a central processing unit configured to control the motorized adjustment device in successive regular increments corresponding to locking increments of the hinge mechanism.

7. The system of claim 1, wherein the motorized adjustment device comprises a pinion which meshes with a toothed sector integral with one of the front connecting rods.

8. The system of claim 1, wherein the electric control device is integrated in said seat.

9. The system of claim 1, further comprising a control interface enabling a user to actuate the electric control device, and said control interface is part of a seat comprising the seating portion and the backrest.

10. The system of claim 1, wherein the motorized adjustment device is of the reversible type, allowing pivotable movement of the backrest when said motorized adjustment device is not actuated, the system further comprising a manual control device suitable for allowing a user to set the anchoring device manually in the release position, the reversible type of motorized adjustment device then enabling the user to move the base into the advanced position.

11. The system of claim 10, wherein the manual control device is accessible from the rear of the backrest of the seat.

12. The system of claim 1, wherein the electric control device controls the anchoring mechanism by means of the electric actuation device, and said electric actuation device is suitable for selectively controlling either the control member of the hinge mechanism or the anchoring mechanism.

13. The system of claim 1, wherein the anchoring mechanism comprises an anchoring member suitable for catching on a receiving member integral with the base, the anchoring member itself being suitable for engaging with the receiving member when the backrest support returns to the rest position with the anchoring mechanism in the anchoring position.

14. The system of claim 1, wherein the backrest support is pivotally mounted on the base.

15. The system of claim 1, wherein the backrest support is mounted on the base by means of rear connecting rods.

16. The system of claim 15, wherein the rear connecting rods are arranged so that the backrest support and the seat backrest tilt forward at an angle comprised between 15 and 40 degrees and rise upward when the backrest support moves from the rest position to the advanced position.

17. The system of claim 15, wherein the rear connecting rods are arranged so that the backrest support and the seat backrest swing forward substantially to the horizontal and rise upward when the backrest support moves from the rest position to the advanced position.

* * * * *